(No Model.)
R. E. MURPHY.
GALVANIC BATTERY.
No. 438,586. Patented Oct. 14, 1890.
Fig. I.
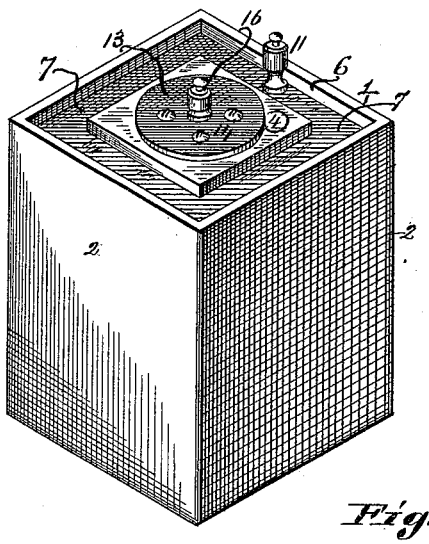
Fig. II.
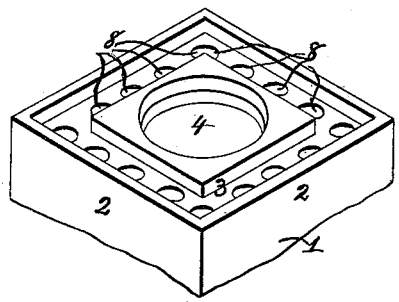
Fig. III.
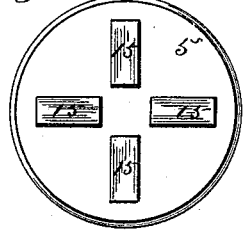
Fig. IV.
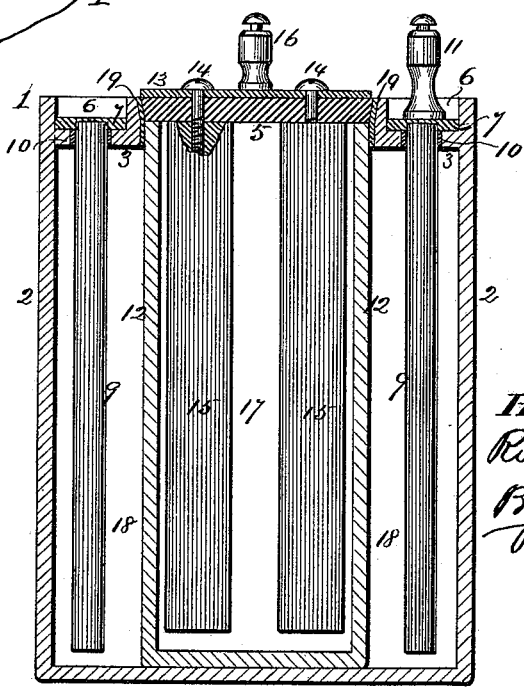
Attest:
E. Arthur
S. H. Knight
Inventor:
Robert E. Murphy
By Knight Bros.
Attys.

UNITED STATES PATENT OFFICE.

ROBERT E. MURPHY, OF ST. LOUIS, MISSOURI, ASSIGNOR OF ONE-HALF TO WILLIAM M. J. CROSSMYER, OF SAME PLACE.

GALVANIC BATTERY.

SPECIFICATION forming part of Letters Patent No. 438,586, dated October 14, 1890.

Application filed April 2, 1890. Serial No. 346,289. (No model.)

*To all whom it may concern:*

Be it known that I, ROBERT E. MURPHY, of the city of St. Louis, in the State of Missouri, have invented a certain new and useful Improvement in Galvanic Batteries, of which the following is a full, clear, and exact description, reference being had to the accompanying drawings, forming part of this specification.

The improvement relates altogether to the construction of the battery, no novelty being claimed in the material or composition of either the solid or liquid elements. The outer vessel has an inside flange made with holes for the passage of the carbon rods forming the negative element of the battery. The flange has an annular channel to receive molten metal serving to connect the carbons and one pole of the battery.

The novel features of the invention will be set forth in the claims.

Figure I is a perspective view of the battery. Fig. II is a perspective view of the outer or main vessel. Fig. III is a bottom view of the zinc bars forming the positive electrode with the cap or cover to which they are connected. Fig. IV is an axial section of the battery.

1 is the main vessel, formed of glazed earthenware, glass, or some other water tight non-conducting material, which is shown as rectangular in form. This shape, however, is not essential. The vessel has sides 2.

3 is an annular flange extending inwardly from the upper part of the sides and made integral with them. This flange has a central orifice 4, closed by a cover 5, which may be of the same material as the main vessel and should fit the orifice tightly. The orifice 4 is shown as circular; but this form is not essential. The flange 3 is made with an annular recess 6 to contain metal 7, furnishing one pole of the battery. The flange has a number of perforations 8 to receive the upper ends of the carbon rods 9, which form, with the metal 7, the negative electrode of the battery. The upper ends of the rods 9 extend up into the recess 6 and are held in that position by luting 10, while the molten copper or other metal 7 is poured into the channel, serving to connect the tops of all the carbon rods together and to hold them firmly in place.

11 is a binding-post, which is fixed in the plate 7.

12 is a porous cup, which is made to fit the orifice 4, and is made of such a height that its upper edge enters the orifice and forms a bearing for the cap 5, so that the cap forms a covering for the jar. The cap has at top a plate or disk 13 of copper or other metal, through which and the body of the cap are made a number of holes for screws 14, which serve to connect to the cap bars or rods 15 of zinc or other metal suitable for the positive electrode of the battery. The screws are tapped into the upper ends of these bars and serve to make electric connection between the bars and the plate 13.

16 is a binding-post fixed to the plate 13, which forms one pole of the battery.

The zinc may be in the form of a plate or plates or sheet or sheets of any form.

The chambers may contain any suitable chemical solutions. For instance, the porous cup may contain a solution of sulphuric acid and the outer chamber nitric acid.

I do not, however, claim any novelty in the solutions used, nor do I confine myself in this respect.

The porous cup may be fitted in the orifice 5 with a gasket, cement, or other packing 19, so as to tightly seal the outer chamber 18, and the cap may be made tight with a gasket or cement 19, so as to seal the inner chamber 17. (See Fig. IV.)

I claim as new and of my invention—

1. A galvanic jar having an inside annular flange 3, with a central orifice 4, adapted to receive a porous jar 12, and a cover 5, supporting an electrode 15, substantially as and for the purpose set forth.

2. The combination of the galvanic jar 1, having an inside flange 3, and with orifice 4, the porous jar 12, the cover 5, fitting the orifice 4 and resting on the porous jar and supporting the electrode 15, and the pole-plate 13, connected with the electrode 15 by screws, substantially as set forth.

3. The combination, in a galvanic battery, of an outer jar 1, having an inside annular flange 3, and with central orifice, a porous jar 12, whose upper end is in the orifice 4, a cover 5, fitting the orifice above the porous jar, and packing 19 between the porous jar and cover and the sides of the orifice 4, substantially as set forth.

4. The combination, in a galvanic battery, of a jar 1, with an inside flange 3, having a recess 6, and having holes to receive the electrode-rods 9, and a pole-plate 7, cast on the upper ends of the rods, for the purpose set forth.

5. The combination, in a galvanic battery, of the outer jar 1, having an inside flange 3, with a recess 7 and with holes 8, electrodes 9, passing through said holes and in electric connection with a pole-plate 7 in the recess 6, a central orifice 4 within the flange, a porous jar 12, whose upper end enters the orifice 4, and a cover 5, closing the orifice 4 and the top of the porous jar, the electrode 15, and a pole-plate 13, connected with the electrode 15 by screw 14, passing through the cover 5, substantially as set forth.

ROBERT E. MURPHY.

In presence of—
SAML. KNIGHT,
E. S. KNIGHT.